(12) United States Patent
Shiang et al.

(10) Patent No.: US 12,492,314 B2
(45) Date of Patent: Dec. 9, 2025

(54) CONDUCTIVE COMPOSITE FILM

(71) Applicant: DDP Specialty Electronic Materials US9, LLC, Wilmington, DE (US)

(72) Inventors: Chen-Yang Shiang, Taoyuan (TW); I-Hua Chen, Taoyuan (TW)

(73) Assignee: DDP SPECIALTY ELECTRONIC MATERIALS US 9, LLC, Midland, MI (US)

( * ) Notice: Subject to any disclaimer, the term of this patent is extended or adjusted under 35 U.S.C. 154(b) by 53 days.

(21) Appl. No.: 18/556,029

(22) PCT Filed: Apr. 22, 2022

(86) PCT No.: PCT/US2022/071866
§ 371 (c)(1),
(2) Date: Oct. 18, 2023

(87) PCT Pub. No.: WO2022/226533
PCT Pub. Date: Oct. 27, 2022

(65) Prior Publication Data
US 2024/0218193 A1    Jul. 4, 2024

Related U.S. Application Data

(60) Provisional application No. 63/178,687, filed on Apr. 23, 2021.

(51) Int. Cl.
*C09D 5/24* (2006.01)
*C08J 7/04* (2020.01)
*C08J 7/044* (2020.01)
*C09D 7/61* (2018.01)
*C09D 183/04* (2006.01)

(52) U.S. Cl.
CPC ............... *C09D 5/24* (2013.01); *C08J 7/042* (2013.01); *C08J 7/044* (2020.01); *C09D 7/61* (2018.01); *C09D 183/04* (2013.01); *C08J 2383/04* (2013.01)

(58) Field of Classification Search
CPC .................................................. C09D 183/04
See application file for complete search history.

(56) References Cited

U.S. PATENT DOCUMENTS

| | | | |
|---|---|---|---|
| 9,199,438 B2 | 12/2015 | Bories-Azeau | |
| 9,761,349 B2 | 9/2017 | Imahashi | |
| 2010/0051920 A1 | 3/2010 | Katsoulis et al. | |
| 2010/0065831 A1* | 3/2010 | Shimoji | H10K 59/125 |
| | | | 438/23 |
| 2011/0143617 A1 | 6/2011 | De la Vega et al. | |

(Continued)

FOREIGN PATENT DOCUMENTS

| | | | | |
|---|---|---|---|---|
| WO | WO 01/49789 A2 * | 12/2001 | ............ | C08L 83/04 |
| WO | 2012041674 A1 | 4/2012 | | |
| WO | 2016110564 A1 | 7/2016 | | |

(Continued)

*Primary Examiner* — Khanh T Nguyen
(74) *Attorney, Agent, or Firm* — Ingrassia Fisher & Lorenz, LLP | IF&L

(57) ABSTRACT

A conductive composite film has four layers: (A) a substrate, (B) a silicone based reactive layer, (C) at least one conductive layer and (D) a silicone encapsulant layer, and the silicone based reactive layer is formed from curable organosiloxane composition.

15 Claims, 5 Drawing Sheets

(56) References Cited

U.S. PATENT DOCUMENTS

2012/0118617 A1    5/2012   Bories-Azeau
2015/0344671 A1   12/2015   Furukawa et al.

FOREIGN PATENT DOCUMENTS

| WO | 2019216756 A1 | 11/2019 |
| WO | 2020074251 A1 | 4/2020 |
| WO | 2020/218235 A1 | 10/2020 |
| WO | 2021/150666 A1 | 7/2021 |

* cited by examiner

CONDUCTIVE COMPOSITE FILM

CROSS-REFERENCE TO RELATED APPLICATION

This application claims the benefit of U.S. Provisional Application No. 63/178,687, filed on Apr. 23, 2021, the disclosure of which is hereby expressly incorporated herein by reference in its entirety.

FIELD OF THE DISCLOSURE

The present disclosure generally relates to a conductive composite film having a silicone elastomer and a conductive layer. The conductive composite film typically has high flexibility and stretching ability suitable for use in wearable device applications and electronic device applications.

BACKGROUND

Conductive films are used as many industries such as electronics and medicals. U.S. Pat. No. 9,761,349B discloses a conductive paste comprising a resin and a conductive filler. Conductive multi-layer films are also known. Normally, conductive multi-layer films comprise a substrate (or a support) which is glass, ceramic or plastic and a conductive layer containing a conductive filler. For flexible conductive films, polymeric substrates are used. Conductive fillers can be applied on the surfaces of substrates by dry processes such as vacuum deposition or sputtering techniques. Wet-coating processes are also used by applying to a substrate a coating composition comprising conductive particles and typically also a binder resin, which is then dried (or sintered) at high-temperature to form a conductive layer.

Conductive nanowires or microwires are also used as conductive fillers. U.S. Pat. Nos. 9,199,438B and 9,554,460B disclose conductive composite films comprising a polymeric substrate comprising a polymeric base layer and a polymeric binding layer, and a conductive layer comprising a plurality of nanowires. The nanowires are bound by the polymeric matrix of the binding layer such that the nanowires are dispersed at least partially in the polymeric matrix of the binding layer. Polyester is used as base layer while co-polyester is used as binding layer.

Silicone elastomers tend to have good properties such as flexibility, stretching ability and water/chemical resistance. Silicone elastomers have been tested as a substrate of a conductive layer comprising conductive fillers, but the interface between the conductive layer and the silicone elastomer does not bond strongly and a practical conductive composite material of silicone elastomer and conductive layer typically cannot be obtained. Therefore, a conductive composite material of silicone elastomer and conductive layer with good bonding is desired.

BRIEF SUMMARY

This disclosure provides a conductive composite film comprising: (A) a substrate, (B) a silicone based reactive layer formed from a curable organosiloxane composition, (C) at least one conductive layer and (D) a silicone encapsulant layer.

BRIEF DESCRIPTION OF DRAWINGS

The present disclosure will hereinafter be described in conjunction with the following drawing figures, wherein like numerals denote like elements, and.

DETAILED DESCRIPTION

Figure 1:
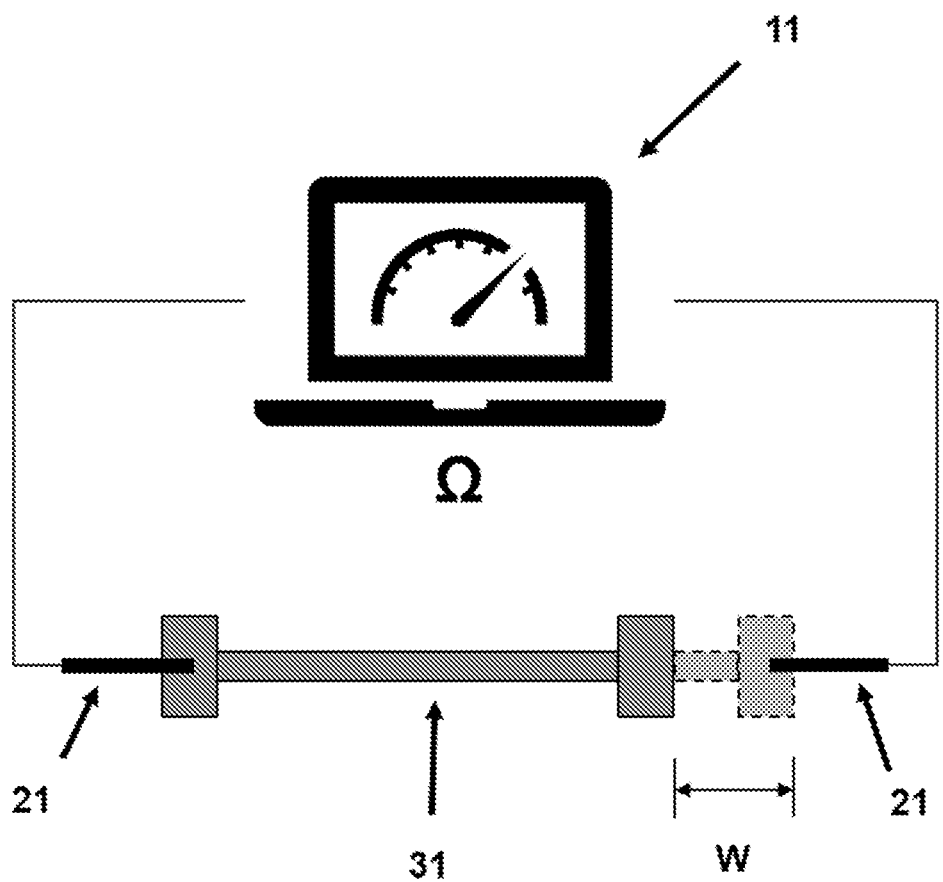
FIG. 1 is a model for analytical equipment for stretching ability.

The following detailed description is merely exemplary in nature and is not intended to limit the disclosure or the application and uses of the subject matter as described herein. Furthermore, there is no intention to be bound by any theory presented in the preceding background or the following detailed description.

One aspect of the disclosure is a conductive composite film comprising:
(A) a substrate,
(B) a silicone based reactive layer,
(C) at least one conductive layer and
(D) silicone encapsulant layer,
wherein the silicone based reactive layer is formed from curable organosiloxane composition.

Another aspect of the disclosure relates to a process for manufacture a conductive composite film disclosed above, comprising the steps of:
(a) applying a curable organosiloxane composition on a substrate (A),
(b) curing the curable organosiloxane composition to form a silicone based reactive layer (B),
(c) forming at least one conductive layer (C) comprising conductive materials on the silicone based reactive layer, and
(d) forming silicone encapsulant layer (D) on the conductive layer.

In various embodiments, all combinations of the aforementioned layers are contemplated. For example, in one embodiment, (B) is disposed on (A), (C) is disposed on (B), and (D) is disposed on (C). It is contemplated that any layer may be disposed on, and spaced apart from, any other layer. Alternatively, any layer may be disposed on, and in direct contact with, any other layer. The terminology "spaced apart from" typically describes embodiments wherein there is an intermediate layer disposed between two other layers. Alternatively, the terminology "in direct contact with" typically describes that there is no intermediate or other layer disposed between the two layers such that the two layers directly contact one another. It is contemplated that one or more of each of (A), (B), (C), and/or (D) may be utilized. For example, one or more (A) may be utilized with one or more (B), one or more (C), and/or one or more (D). Each individual layer may be independently disposed on, and either spaced apart from or in direct contact with, any one or more other layers. Any one or more of (A), (B), (C), and/or (D), may be disposed partially or completely on any one or more other of (A), (B), (C), and/or (D). It is also contemplated that two or more of any of (A), (B), (C), and/or (D), may be disposed in the same plane, e.g. next to each other, and be disposed on any one or more others of (A), (B), (C), and/or (D). In various non-limiting embodiments, all combinations of the aforementioned descriptions are hereby expressly contemplated for use herein.

(A) Substrate:

The conductive composite film comprises a (A) substrate or substrate layer. The film may include one or more than one (A). The substrate works as a support of the composite film. At the same time, the substrate provides functions to the conductive composite film. Any substrate can be used. Examples of such substrates include, but are not limited to, plastics, elastomers, fabrics, metals, ceramics, glass, and combinations thereof. When the substrate is a silicone elastomer, the composite film shows excellent flexibility and stretching ability those are suitable for the use in wearable device applications.

The thickness of the substrate is not particularly limited. In various embodiments, the thickness is from about 20 to about 300, about 50 to about 200, about 25 to about 275, about 50 to about 250, about 75 to about 225, about 100 to about 200, about 125 to about 175, or about 150 to about 175, micrometers. In various non-limiting embodiments, all values and ranges of values, both whole and fractional, including and between each of the aforementioned values, are hereby expressly contemplated for use herein.

(B) Silicone Based Reactive Layer

The (B) silicone based reactive layer of this disclosure is formed from curable organosiloxane composition. The film may include one or more than one (B). The terminology "based" means that the reactive layer comprises, is, consists essentially of, or consists of, the curable organosiloxane before, during, or after cure. The terminology "consists essentially of" describes embodiments wherein the reactive layer is free of, or includes less than about 10, 9, 8, 7, 6, 5, 4, 3, 2, 1, 0.5, or 0.1, weight percent of a polymer that is not the curable organosiloxane composition or its cured or partially cured product. The terminology "formed from" means that the reactive layer typically comes into existence when the curable organosiloxane composition cures or partially cures. The degree of cure or partial cure can be determined by one of skill in the art. The terminology "curable" describes that the organosiloxane composition is capable of curing. The precise type of curing is not particularly limited and may be chosen by one of skill in the art. In various non-limiting embodiments, all values and ranges of values, both whole and fractional, including and between each of the aforementioned values, are hereby expressly contemplated for use herein.

In one embodiment, the curable organosiloxane composition is, includes, consists essentially of, or consists of, at least one (B-i) an organosilicone compound and at least one (B-ii) organic metal compound. The at least one (B-i) organosilicone compound and the at least one (B-ii) organic metal compound can react (crosslink) by a moisture cure to form silicone based reactive layer. However, their reaction is not limited to this type of cure mechanism. The terminology "consists essentially of" describes embodiments that may be free of, or include less than about 10, 9, 8, 7, 6, 5, 4, 3, 2, 1, 0.5, or 0.1, weight percent of other monomers and/or organic compounds and/or metal compounds, not described herein. In various non-limiting embodiments, all values and ranges of values, both whole and fractional, including and between each of the aforementioned values, are hereby expressly contemplated for use herein.

In various embodiments, the at least one (B-i) organosilicone compound is represented by the following formula (I) or (II). It is contemplated that one or more (B-i) organosilicone compounds may be utilized wherein each independently has formula (I) or (II)

$$R^1_x Si(OR^2)_{4-x} \quad (I)$$

$$R^1_y Si(OR^4 OR^5)_{4-y} \quad (II)$$

wherein each $R^1$ is independently an alkyl group or an allyl group each independently having 1 to 16 carbon atoms, $R^2$ is an alkyl group having 1 to 4 carbon atoms, x is an integer from 1 to 3, $R^4$ is an alkyl group having 1 to 16 carbon atoms, $R^5$ is an alkyl group having 1 to 16 carbon atoms, and y is an integer from 0 to 4. In various non-limiting embodiments, all values and ranges of values, both whole and fractional, including and between each of the aforementioned values, are hereby expressly contemplated for use herein.

For example, each $R^1$ is independently an alkyl group having 1 to 16 carbon atoms or an allyl group having 1 to 16 carbon atoms. In various embodiments, the alkyl and/or allyl group independently has 1, 2, 3, 4, 5, 6, 7, 8, 9, 10, 11, 12, 13, 14, 15, or 16, carbon atoms, or any range of such values, e.g. 1 to 16, 2 to 15, 3 to 13, 4 to 12, 5 to 11, 6 to 10, 7 to 9, 8 to 9, 8 to 10, 8 to 12, 8 to 14, 8 to 16, 6 to 8, 6 to 10, 6 to 12, 6 to 14, 6 to 16, 10 to 16, 10 to 14, 10 to 12, 12 to 16, 12 to 14, etc. Moreover, $R^2$ is an alkyl group having 1 to 4 carbon atoms, e.g. 1, 2, 3, or 4, carbon atoms or any range of such values. Furthermore, x is an integer from 1 to 3, e.g. 1, 2, or 3. $R^4$ is an alkyl group having 1 to 16 carbon atoms which may be any as described above. Similarly, $R^5$ is an alkyl group having 1 to 16 carbon atoms, which may be any as described above. Also, y is an integer from 0 to 4, e.g. 0, 1, 2, 3, or 4. In various non-limiting embodiments, all values and ranges of values, both whole and fractional, including and between each of the aforementioned values, are hereby expressly contemplated for use herein.

Non-limiting examples of the at least one (B-i) organosilicone compound include, without limitation, allyltrimethoxysilane, 1-methoxyisopropyl orthosilicate, tetrakis (2-butoxyethyl) orthosilicate, and trimethoxyvinylsilane, and combinations thereof.

The at least one (B-ii) organic metal compound is represented by the following formula (III), $$Ti(OR^3)_4 \quad (III)$$

wherein $R^3$ is an allyl group having 1 to 10 carbon atoms. For example, the allyl group may have 1, 2, 3, 4, 5, 6, 7, 8, 9, or 10, or 2 to 9, 3 to 8, 4 to 7, 5 to 6, 2 to 8, 4 to 8, 4 to 6, 2 to 6, 2 to 4, 6 to 8, carbon atoms, etc. In various non-limiting embodiments, all values and ranges of values, both whole and fractional, including and between each of the aforementioned values, are hereby expressly contemplated for use herein.

Non-limiting examples of the at least one (B-ii) organic metal compound include, without limitation, tetra n-butyl titanate, and combinations thereof.

The amount of the at least one (B-i) that is utilized is not particularly limited and may be any known in the art. For example, the amount may be about 0.1 to about 99.9, about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 45 to about 50, weight percent based on a total weight of the curable organosiloxane composition. Similarly, the amount of the least one (B-ii) is also not particularly limited and may be any known in the art. For example, the amount may independently be about 0.1 to about 99.9, about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 45 to about 50, weight percent based on a total weight of the curable organosiloxane composition. In various non-limiting embodiments, all values and ranges of values, both whole and fractional, including and between each of the aforementioned values, are hereby expressly contemplated for use herein.

The curable organosiloxane composition can further comprise, or be free of, a solvent. Examples of solvent includes, without limitation, n-heptane and similar carbon solvents, as recognized by those of skill in the art. The amount of the solvent that is utilized is not particularly limited and may be any known in the art. For example, the amount may be about 0.1 to about 99.9, about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, or about 45 to about 50, weight percent based on a total weight of the curable organosiloxane composition. In various non-limiting embodiments, all values and ranges of values, both whole and fractional, including and between each of the aforementioned values, are hereby expressly contemplated for use herein.

This disclosure also provides a process for manufacture a conductive composite film comprising the steps of:
(a) applying the curable organosiloxane composition on the substrate (A),
(b) curing the curable organosiloxane composition to form the silicone based reactive layer (B),
(c) forming the at least one conductive layer (C) comprising a conductive material on the (B) silicone based reactive layer, and
(d) forming the silicone encapsulant layer (D) on the conductive metal layer.

For example, the curable organosiloxane composition may be applied on a substrate (A) by any known method. Examples of such methods include, without limitation, spraying, dipping, screen printing, wiping and gravure coating. After applying the curable organosiloxane composition, the substrate is typically subject to moisture such that the organosilane compound and organic metal compound react to form a silicone based reactive layer, for example, in an atmosphere of from about 0 to about 60, about 5 to about 60, about 10 to about 60, about 15 to about 60, about 20 to about 60, about 25 to about 55, about 30 to about 50, about 35 to about 45, or about 40 to about 45, % moisture, for a time of from about 10 to about 50, about 15 to about 45, about 20 to about 40, about 25 to about 35, or about 30 to about 35, minutes at a room temperature, for example about 15 to about 30, about 20 to about 25, or about 25 to about 30, ° C. In various non-limiting embodiments, all values and ranges of values, both whole and fractional, including and between each of the aforementioned values, are hereby expressly contemplated for use herein.

(C) Conductive Layer

Referring now to the at least one (C) conductive layer, the film may include one or more than one (C). This layer comprises a conductive material, e.g. one or more conductive materials. The conductive material is not particularly limited and may be any known in the art. Conductive materials are also called as conductive fillers. Flakes, or wire-shaped conductive materials are typical. Wire-shaped conductive materials include metal nanowires, metal microwires and carbon nanotubes. The use of conductive nanowires and/or microwires for conductive layer can be implemented, e.g. as described in US2012/0118617A, the disclosure is expressly incorporated herein by reference. As used herein, the term 'nanowire' and 'microwire' refer to an element having an aspect ratio (i.e. the length L divided by the width W) typically of from about 10 to about 100,000. The aspect ratio is greater than 10, typically greater than 50, and more typically greater than 100. The upper limit may be any up to about 100,000, for example, about 500, about 1,000, about 5,000, about 10,000, about 15,000, about 20,000, about 25,000, about 30,000, about 35,000, about 40,000, about 45,000, about 50,000, about 55,000, about 60,000, about 65,000, about 70,000, about 75,000, about 80,000, about 85,000, about 90,000, about 95,000, or about 100,000.

Moreover, any of the aforementioned values may also be the lower limit of a range. The cross sectional dimension of the nanowire may be less than 500 nm, typically less than 200 nm, and more typically less than 100 nm. In various embodiments, the cross sectional dimension of the nanowire may be from about 1 to about 500, about 25 to about 475, about 50 to about 450, about 75 to about 425, about 100 to about 400, about 125 to about 375, about 150 to about 350, about 175 to about 325, about 200 to about 300, about 225 to about 275, or about 250 to about 275, nm. Flake shaped conductive materials are also typical. The particle size of the flake shaped conductive materials are typically from about 0.1 to about 15 micrometers, more typically from about 0.1 to about 10 micrometers. In various embodiments, the particle size may be described as any of Dv10 and/or Dn10, Dv50 and/or Dn50, Dv90 and/or Dn90, or combinations thereof, using any apparatus known in the art, e.g. a Malvern particle size analyzer such as the well-known Malvern MS2000. This value may be an average, median, or mean value. In various non-limiting embodiments, all values and ranges of values, both whole and fractional, including and between each of the aforementioned values, are hereby expressly contemplated for use herein.

Conductive materials include metal fillers and other conductive particles. Examples of such conductive particles include, without limitation, carbon nanotubes (CNTs), conductive polymer fibers and the like. Typically, such conductive particles have an aspect ratio of 10 or greater, wherein an upper value of an aspect ratio may be chosen by one of skill in the art. Metals of the metal fillers can include elemental metals, metal alloys and metal compounds including metal oxides, and combinations thereof. Metals, metal alloys and metal oxides that can be used as metal fillers include, without limitation, Cu, Au, Ni, Pd, Co, Pt, Ru, W, Cr, Mo, Ag and Co, and alloys or oxides thereof. Suitable metal fillers can be of any metal, and of particular silver, gold, copper and nickel, and combinations thereof.

In another advantageous embodiment, the conductive layer comprises at least one metal filler and at least one non-metallic filler. Examples of such combination can include, without limitation, silver fillers and carbon nanotubes, gold fillers and carbon nanotubes, and copper fillers and carbon nanotubes.

The conductive layer can be formed typically by applying a dispersion comprising conductive materials and a liquid (e.g. a carrier solvent/polymer) to the silicone based reactive layer (B). The conductive materials can be dispersed in a carrier solvent/polymer. Any suitable liquid can be used such as organic liquid/solvent or water. The organic liquid/solvent may be any known in the art and may be chosen by one of skill in the art.

Typically an organic liquid dispersion or solution of the conductive materials and a liquid is utilized. The dispersion or solution optionally further comprises a carrier solvent (or carrier polymer). Examples of the carrier polymer include, without limitation, carbitol acetate, triethyl phosphate, dimethyl glutarate, dimethyl succinate, ester compound, 4-hydroxy-4-methylpentan-2-one (4-hydroxy-4-methylpentan-2-one) and dipropylene glycol methyl ether, and combinations thereof. The dispersion or solution optionally further includes additives such as viscosity modifiers, surfactant, corrosion inhibitors and the like, as is known in the art.

The dispersion or solution can be applied on the silicone based reactive layer by any known method. Examples of such methods include, without limitation, screen printing, spraying, dipping, wiping and gravure coating. After application, the dispersion or solution can be heated at, or to, the temperature at which the liquid in the solution is vaporized, which is known to one of skill in the art.

The conductive layer can be a single layer or multiple layers. When two or more kinds of conductive materials are included in the conductive layer, the above steps (i.e. applying a solution comprising conductive materials, then heating it until the solution forms a layer) can be repeated.

The thickness of the conductive layer is typically from about 5 to about 300 micrometers, more typically from about 10 to about 150 micrometers. In various embodiments, the thickness is from about 10 to about 290, about 15 to about 280, about 20 to about 270, about 25 to about 265, about 30 to about 260, about 35 to about 255, about 40 to about 250, about 45 to about 245, about 50 to about 240, about 55 to about 235, about 60 to about 230, about 65 to about 225, about 70 to about 220, about 75 to about 215, about 80 to about 210, about 85 to about 205, about 90 to about 200, about 95 to about 195, about 100 to about 190, about 105 to about 185, about 110 to about 180, about 115 to about 175, about 120 to about 170, about 125 to about 165, about 130 to about 160, about 135 to about 155, about 140 to about 150, or about 145 to about 150, micrometers. In various non-limiting embodiments, all values and ranges of values, both whole and fractional, including and between each of the aforementioned values, are hereby expressly contemplated for use herein.

(D) Silicone Encapsulant Layer

Referring now to the (D) silicone encapsulant layer, the film may include one or more than one (D). This layer may be, include, consist essentially of, or consist of, a silicone encapsulant composition which can form a silicone layer upon reaction or cure. This layer can be used to protect a reactive material or delicate material or any part of the instant film. Moreover, the terminology "consist essentially of" may describe embodiments that are free of, or include less than about 10, 9, 8, 7, 6, 5, 4, 3, 2, 1, 0.5, or 0.1, weight percent of polymers that are not silicones, based on a total weight of the silicone encapsulant composition. In various non-limiting embodiments, all values and ranges of values, both whole and fractional, including and between each of the aforementioned values, are hereby expressly contemplated for use herein.

The silicone encapsulant composition typically has a polydimethylsiloxane chemical structure wherein a siloxane backbone is surrounded by methyl groups to result in a layer that is highly permeable to gas/moisture, electronically isolating, and exhibiting hydrophobic property. The low interaction of methyl groups can provide a breathable barrier to benefit skin contact applications (e.g. non-occlusive).

The natural appearance of silicone is transparent to translucent depending on the formulation. However, silicone elastomers are generally pigmentable to color their appearance. Transparent and translucent silicones can be seen through to have better observation while color appearances are typically pursued to aesthetic purposes.

A silicone elastomer is a 3-dimensional network brought about by a cross-linking reaction via molding techniques (i.e. compression or injection) to form a designed shape. The cross-linked elastomer, in its various formulations, can have hardness range from about Shore 00 to about Shore A. Due to the elastic nature of elastomers, they tend to be stretchable within its elongation at break e.g. about 200 to about 1,000%. In various non-limiting embodiments, all values and ranges of values, both whole and fractional, including and between each of the aforementioned values, are hereby expressly contemplated for use herein.

The general composition of silicone elastomers comprise "Dimethyl Siloxane, Dimethylvinylsiloxyterminated", filler, "Siloxanes and Silicones, di-Me, Me-vinyl, vinyl group-terminated", "Polydimethylsiloxane hydroxy-terminated" and "Dimethyl, Methylhydrogen Siloxane, Trimethylsiloxy-terminated". Examples of the fillers include, without limitation, fumed silica, precipitated silica, diatomaceous mineral and barium sulfate.

The general composition of silicone Soft Skin Adhesives (SSA) comprise "Dimethyl Siloxane, Dimethylvinylsiloxy-terminated", "Siloxanes and silicones, dimethyl", "Siloxanes and Silicones, di-Me, hydrogen-terminated" and "Siloxanes and Silicones, di-Me, Me hydrogen"

The general composition of silicone Pressure Sensitive Adhesives (PSAs) comprise "Trimethylated silica treated with dimethyl siloxane" and "carrier solvent" where the carrier solvent includes, without limitation, n-hexane, mineral spirit, isopropanol, toluene, xylene, hexamethyldisiloxane, ethyl acetate and octamethyltrisiloxane.

A curable encapsulant, such as a silicone encapsulant or the silicone encapsulant layer, can be applied on the at least one conductive layer (C) by any known method. When the curable encapsulant is an elastomer (elastomers and SSA), examples of such methods include, without limitation, screen printing, gravure coating, dipping, wiping and molding. After applying the curable encapsulant composition, the substrate can be exposed to an elevated temperature in an oven to accelerate the cure (cross linking).

When curable encapsulant is a silicone Pressure Sensitive Adhesive (PSA), examples of such methods include, without limitation, gravure coating, dipping, and wiping. After applying a PSA encapsulant composition, the substrate can be exposed to an elevated temperature in an oven to remove/evaporate a carrier solvent.

In various embodiments, the thickness of the silicone encapsulant layer is typically from about 50 to about 500 micrometers, more typically from about 100 to about 300 micrometers. In various embodiments, the thickness is from about 60 to about 490, about 70 to about 480, about 80 to about 470, about 90 to about 460, about 100 to about 450, about 110 to about 440, about 120 to about 430, about 130 to about 420, about 140 to about 410, about 150 to about 400, about 160 to about 390, about 170 to about 380, about 180 to about 370, about 190 to about 360, about 200 to about 350, about 210 to about 340, about 220 to about 330, about 230 to about 320, about 240 to about 310, about 250 to about 300, about 260 to about 290, or about 270 to about 280, micrometers. In various non-limiting embodiments, all values and ranges of values, both whole and fractional, including and between each of the aforementioned values, are hereby expressly contemplated for use herein.

By repeating the aforementioned steps of the method, the conductive composite film can be prepared. The thickness of the conductive composite film is typically from about 50 to about 5,000 micrometers. In various embodiments, the thickness is from about 50 to about 100, about 55 to about 95, about 60 to about 90, about 65 to about 85, about 70 to about 80, about 75 to about 80, about 100 to about 5000, about 500 to about 4500, about 1000 to about 4000, about 1500 to about 3500, about 2000 to about 3000, or about 2500 to about 3000, micrometers. In various non-limiting embodiments, all values and ranges of values, both whole and fractional, including and between each of the aforementioned values, are hereby expressly contemplated for use herein.

The conductive composite film typically has many excellent properties, such as high flexibility, stretching ability, and water/chemical resistance, e.g. as would be understood by those of skill in the art.

The conductive composite material of this disclosure can be used in various industries and applications, for example, electronics device applications such as flat liquid crystal displays, electroluminescent devices, touch screens in electronic equipment, photovoltaic cells, and EMI shielding screens.

The conductive composite film of this disclosure can also be used in various wearable devices, for example, electrocardiogram (ECG), electroencephalogram (EEG), electrogastrogram (EGG), motion biosignals-pressure, strain and epidermal differential impedance (EDI), electromyogram (EMG), -electrooculogram (EOG) and electroretinogram (ERG).

EXAMPLES

Analytical Methods
Stretching Ability

A dog bone shape with dimension of 100×7 mm of conductor was prepared as specimen pattern (test sample).

A tester, which has displacement and speed controllable equipment with real time resistance measurement capability, was used.

To evaluate stretching ability, a specimen is placed with the tester as shown in FIG. 1. A resistance measurement instrument (11) was electrically connected with a dog bone shaped specimen (31) by a copper electrode (21). The dog bone shaped specimen was stretched to the length (W), as shown in FIG. 1. When the specimen is stretched to 120 mm, it means 20% stretching over the original length (100 mm). The stretching % was adjustable for performance tests. When the specimen is stretched forward and backward from 100 mm to 120 mm with same speed, it is counted as 1 cycle. The stretching was repeated for designed cycles, e.g. 100 cycles. The resistance data was plotted against each stretching cycles, to show the resistance growth performance during 100 cycles stretching.

Comparative Example 1 (Existing Composite Film)

A thermal polyurethane base film, provided by DuPont as product name TE-11C, was used as a substrate. Carbon paste, comprising carbon nanotubes and Dipropylene Glycol Methyl Ether provided by DuPont as product name PE671 was screen printed on the thermal polyurethane base film, then dried (solvent was evaporated) in an oven at 130° C. for 10 minutes. After that, silver paste, comprising silver nanowires and Carbitol Acetate, Triethyl Phosphate provided by DuPont as product name PE876 was screen printed on the carbon nanotubes layer, dried in an oven at 130° C. for 10 minutes. The screen printed and dried steps were repeated again to form two silver layers. Then, thermal polyurethane encapsulant, provided by DuPont as product name PE773 was screen printed, then heated at 130° C. for 10 minutes. The obtained composite film was cut for the dog-bone shape with dimension of 100×7 mm for stretching ability test.

Inventive Example 1

A silicone elastomer base film, provided by DuPont as product name 7-4107, was used as a substrate.

A primer, comprising 4.0-5.0 wt % of allyltrimethoxysilane, 1.2-1.6 wt % of tetra n-butyl titanate and n-heptane (remain) was screen printed on the silicone elastomer base film, then air dried for 10 to 15 minutes. This is a type of (B) silicone based reactive layer.

Then, carbon paste, comprising carbon nanotubes and Dipropylene Glycol Methyl Ether, provided by DuPont as product name PE671, was screen printed on the thermal polyurethane base film, then dried (solvent was evaporated) in an oven at 130° C. for 10 minutes. After that, silver paste, comprising silver nanowires and Carbitol Acetate, Triethyl Phosphate, provided by DuPont as product name PE876, was screen printed on the carbon nanotubes layer, dried in an oven at 130° C. for 10 minutes. The screen printed and dried steps were repeated again to form two silver layers. This is an example of (C) at least one conductive layer, i.e., two conductive layers.

Then, silicone elastomer, provided by Dow Corning as product name MDX4-4210, was screen printed, then heated at 130° C. for 10 minutes. This is a (D) silicone encapsulant layer.

The obtained composite film was cut for the dog-bone shape same as disclosed in Comparative Example 1.

Inventive Example 2

The same procedure as described above for Example 1 was conducted except that the silicone adhesive, provided by DuPont as product name MG7-9960, was used instead of MDX4-4210.

Figure 2:
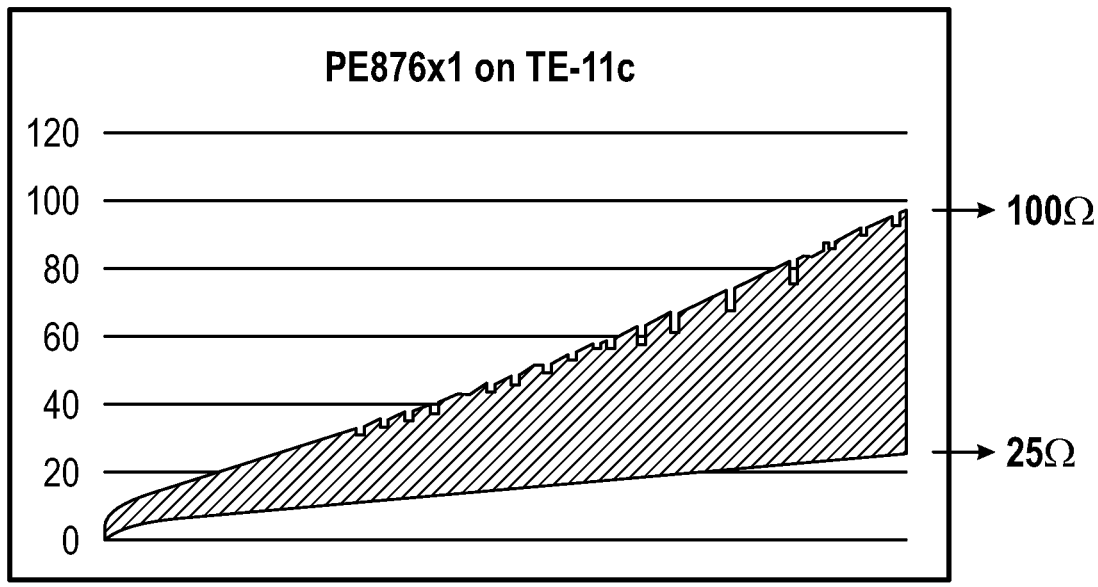
FIG. 2 is a stretching test result of Comparative example 1.
Figure 3:
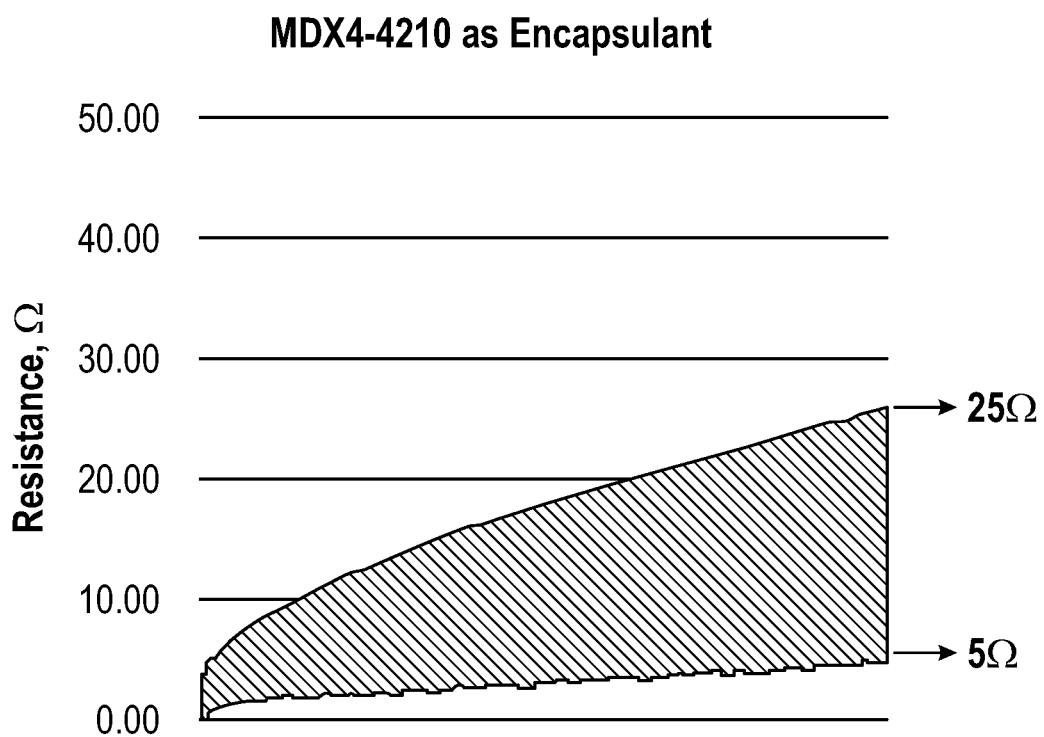
FIG. 3 is a stretching test result of Example 1.
Figure 4:
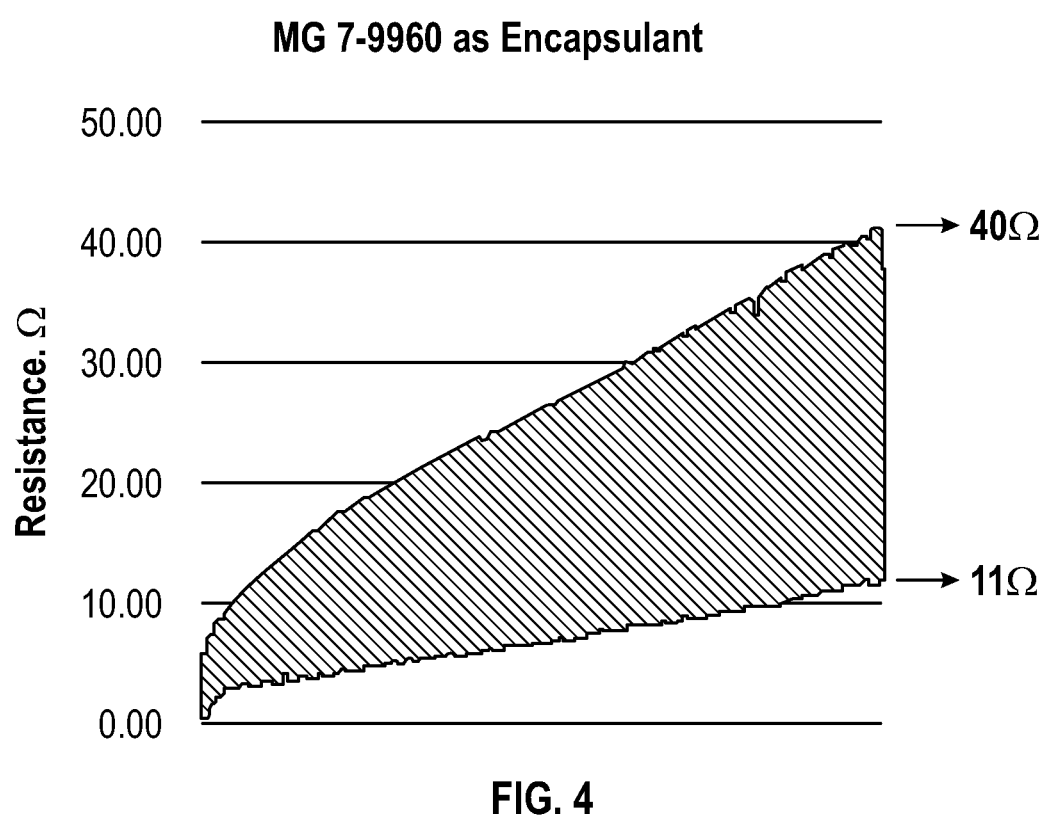
FIG. 4 is a stretching test result of Example 2.
Figure 5:
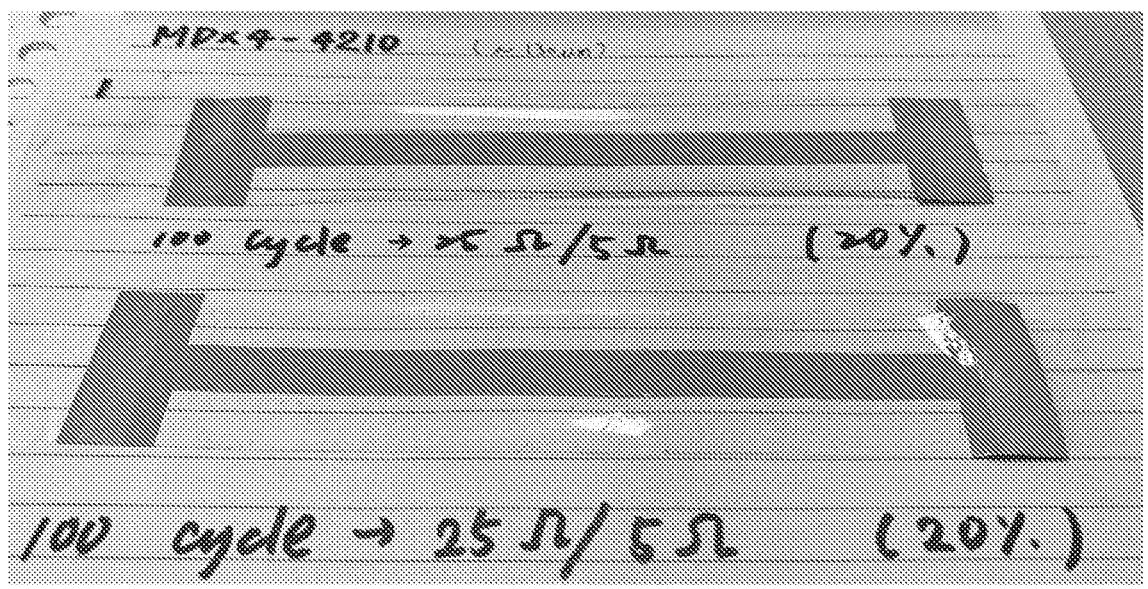
FIG. 5 is a photo of dog-bone shape test sample of Example 1.
Figure 6:
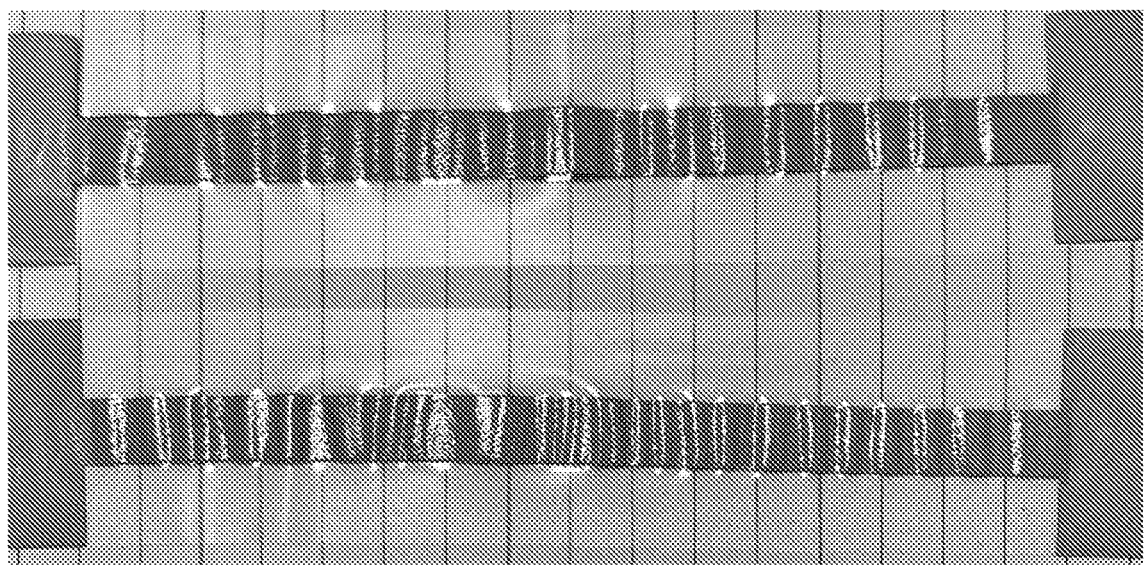
FIG. 6 is a photo of dog-bone shape test sample of Comparative Example 1.

Stretching ability for each of the aforementioned films was tested for the three test samples and the results are shown as FIG. 2 (Comparative example 1), FIG. 3 (Example 1) and FIG. 4 (Example 2).

After 100 cycles at 20% stretching ability test, the resistance of Comparative Example 1 was increased from 25 (minimum resistance) to 100Ω (max resistance), while the resistance of Examples 1 and 2 was 5 (minimum resistance) to 25Ω (max resistance) and 11 (minimum resistance) to 40Ω (max resistance) respectively. This shows both maximum resistance and minimum resistance are reduced from an existing composite film.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A conductive composite film comprising:
(A) a substrate,
(B) a silicone based reactive layer formed from a curable organosiloxane composition,
(C) at least one conductive layer and
(D) a silicone encapsulant layer;
wherein the curable organosiloxane composition comprises:
at least one (B-i) organosilicone compound represented by the following formula (I) or (II):

$$R^1_x Si(OR^2)_{4-x} \quad (I)$$

$$R^1_y Si(OR^4 OR^5)_{4-y} \quad (II)$$

wherein each $R^1$ is independently an alkyl group or an allyl group each independently having 1 to 16 carbon atoms, $R^2$ is an alkyl group having 1 to 4 carbon atoms, x is an integer from 1 to 3, $R^4$ is an alkyl group having 1 to 16 carbon atoms, $R^5$ is an alkyl group having 1 to 16 carbon atoms, and y is an integer from 0 to 4; and
at least one (B-ii) organic metal compound represented by the following formula (III), $$Ti(OR^3)_4 \quad (III)$$

wherein $R^3$ is an allyl group having 1 to 10 carbon atoms.

2. The conductive composite film of claim 1, wherein the substrate is selected from the group consisting of plastics, elastomers, fabrics, metals, ceramics, glasses, and combinations thereof.

3. The conductive composite film of claim 1, wherein the substrate is a silicone elastomer.

4. The conductive composite film of claim 1, wherein the silicone encapsulant layer comprises silicone elastomers, silicone adhesives, or combinations thereof.

5. The conductive composite film of claim 1, wherein the conductive layer comprises a conductive material having an aspect ratio of about 10 to about 100,000.

6. The conductive composite film of claim 1, wherein the conductive material comprises silver, carbon, or combinations thereof.

7. The conductive composite film of claim 1 having a thickness of from about 50 to about 5,000 micrometers.

8. The conductive composite film of claim 1 that is flexible.

9. A process for manufacture a conductive composite film of claim 1, comprising the steps of:
(a) applying the curable organosiloxane composition on the substrate (A),
(b) curing the curable organosiloxane composition to form the silicone based reactive layer (B),
(c) forming the at least one conductive layer (C) comprising a conductive material on the (B) silicone based reactive layer, and
(d) forming the silicone encapsulant layer (D) on the conductive metal layer.

10. The process of claim 9, wherein the at least one (B-i) organosilicone compound and the at least one (B-ii) organic metal compound are crosslinked by 20 to 80% via a moisture cure for 1 to 60 minutes.

11. The process of claim 9, wherein the at least one conductive layer (C) is formed by the steps of:
(c-i) applying a paste on the (B) silicone based reactive layer, wherein the past comprises a conductive material, a carrier polymer, and a rheology modifier,
(c-ii) heating the applied paste to at least partially evaporate the rheology modifier.

12. The conductive composite film of claim 1, used for flat liquid crystal displays, electroluminescent devices, touch screens in electronic equipment, photovoltaic cells and EMI shielding screens.

13. The conductive composite film of claim 1, used for electrocardiogram, electroencephalogram, electrogastrogram, motion biosignals-pressure and strain, epidermal differential impedance, electromyogram, electrooculogram and electroretinogram.

14. The conductive composite film of claim 1, wherein the at least one (B-i) organosilicone compound comprises allyltrimethoxysilane, 1-methoxyisopropyl orthosilicate, tetrakis (2-butoxyethyl) orthosilicate, trimethoxyvinylsilane, or combinations thereof.

15. The conductive composite film of claim 1, wherein at least one (B-i) organosilicone compound is represented by formula (I):

$$R^1_x Si(OR^2)_{4-x} \quad (I)$$

wherein $R^1$ is an alkyl group or an allyl group each independently having 1 to 5 carbon atoms, $R^2$ is an alkyl group having 1 to 3 carbon atoms, and x is an integer from 1 to 3.

* * * * *